Figure 1:
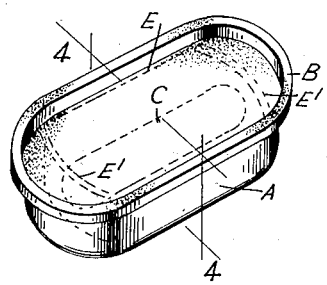

Feb. 19, 1935.  G. S. DAWE  1,991,380

PATCH VULCANIZING OUTFIT

Filed July 21, 1933

Inventor
George Samuel Dawe
By B. Singer, atty.

Patented Feb. 19, 1935

1,991,380

UNITED STATES PATENT OFFICE 1,991,380

PATCH VULCANIZING OUTFIT

George Samuel Dawe, Mortdale, near Sydney, New South Wales, Australia

Application July 21, 1933, Serial No. 681,607
In Australia August 10, 1932

3 Claims. (Cl. 18—18)

This invention relates to portable patch vulcanizing outfits which are especially adapted for use in vulcanizing patches onto rubber articles such as the tyre tubes of motor vehicles, and which are of the type which includes a heating unit and a clamp, the heating unit being superimposed on the repair patch and the whole clamped on to the article to be repaired.

Hitherto in this type of device, the heating unit has been in the form of a pan containing or adapted to contain a block of combustible material and the required heat is obtained by combustion of this material which is ignited by the application of a flame and burns until consumed.

It is obvious that a naked flame near a motor vehicle is a source of danger owing to the presence usually of a body of highly inflammable liquid, and occasionally of inflammable gas. Moreover, in the open air when there is considerable wind, there is a difficulty sometimes in igniting the combustible block, in maintaining regularity of combustion, and obtaining the required heat for vulcanization.

It is the object of this invention to provide a repair vulcanizing outfit in which the required heat is obtained by chemical action, the heat being obtained by or resulting from the admixture of appropriate chemicals. A further object of the invention is to provide an outfit which when in use is fumeless, unaffected by dampness, wind or other atmospheric influences and is therefore effective under practically all conditions and at all times.

With these objects in view the invention consists in a vulcanizing unit for a patch repair outfit of the type referred to, comprising a closed hollow metal container of deformable construction, a repair patch secured to one exterior face of said container, within said container a sealed glass vessel containing a liquid acid and which is fractured to release said acid by sufficient deformation of said container, and a quantity of a chemical substance packed adjacent said vessel in said container, said chemical substance cooperating with the released acid to generate heat by chemical reaction to effect vulcanization of the patch.

In a preferred embodiment of the invention the heating unit consists of an appropriately shaped hollow and hermetically sealed container in which is a sealed phial or vessel of readily fracturable and acid proof material, such as glass, charged with a fluid such as commercial sulphuric acid, and packed about said vessel is a quantity of a complementary chemical substance such as an appropriate caustic alkali which when subjected to the action of the acid will generate sufficient heat to effect the required vulcanization. The admixture of the chemicals is brought about by the fracturing of the acid-containing vessel as a result of distortion of part of the container when being clamped on to the job. The operative head of the clamp is formed to bear upon the peripheral upper edge of the container, and has a central excrescence or pip which bears upon and depresses the top of the container sufficiently to fracture the glass vessel within.

Figure 2:
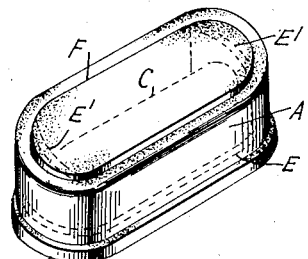
Figure 3:
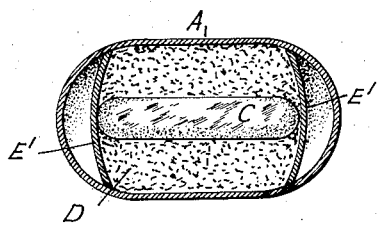
Figure 4:
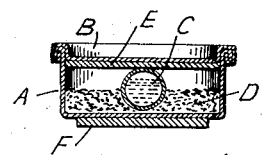

To fully explain the invention reference is now made to the accompanying drawing which depicts a preferred embodiment and in which Fig. 1 is a perspective view of a heating unit, Fig. 2 a similar view inverted, Fig. 3 is a sectional plan, and Fig. 4 is a sectional elevation on plane 4, 4 of Fig. 1.

Figure 5:
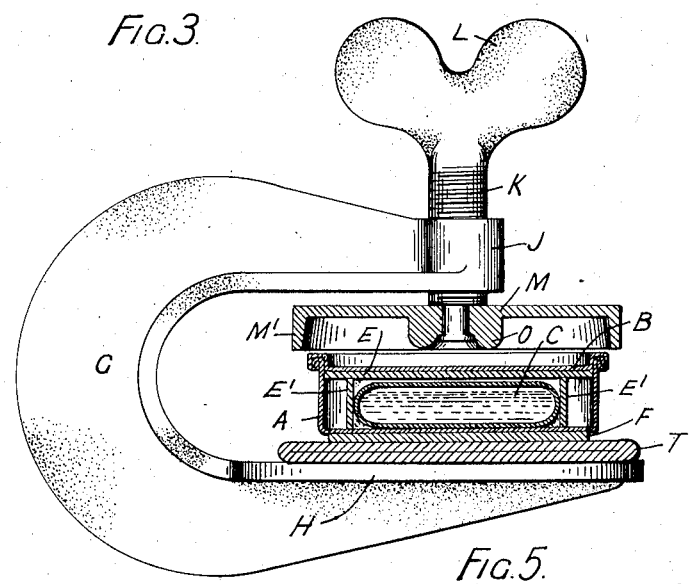

Fig. 5 is a sectional elevation of a complete outfit applied to a collapsed tyre-tube.

The heating unit comprises a pressed or spun metal container A with a thin metal dished top B hermetically secured thereon in known manner. Within the container is a sealed glass vessel C containing commercial sulphuric acid, and about said vessel is a quantity D of a powdered strong caustic alkali such as caustic soda or caustic potash. Located between the cover B and vessel C and tightly fitting in the container A is a washer E of soft cardboard or like moderately compressible substance which when the top is secured on the container is very adjacent to the vessel C. This vessel is of less length than the container, and is held in position by flexed pieces of cardboard $E^1$ against which the ends of the vessel C bear as shown in Figs. 3 and 5. The purpose of the cardboard pieces $E^1$ is to prevent the vessel C from moving in the container A and being thus accidentally fractured, and the washer E serves to keep air from the powdered chemical in the interval between the filling and closing of the container.

Secured to the bottom of the container is the repair patch F prepared in known manner.

The clamp is generally of ordinary construction comprising a yoke member G with fixed lower platen H, and a screw-threaded head J in which is fitted a threaded spindle K having at its upper end a turning handle L and at its lower end a rotatably mounted operative head M. This head has a peripheral flange $M^1$ adapted to fit about the upper part of the container A and is centrally formed with a bulge or excrescence O adapted to bear upon the top B of the container as the spindle K is screwed down and to depress it sufficiently to fracture the vessel C and release the acid. The construction is such that this fracturing of the vessel C occurs immediately before the head M bears upon the container rim, and the parts are proportioned accordingly, it being understood that the bearing of excrescence O on the top B must not prevent the ultimate bearing of the head M on the rim of the container equally at all points in order to provide an even pressure on the patch F.

Fig. 5 shows the application of the outfit to the repair of a punctured tube T shown in section.

It will be understood that the vessel C should be so disposed and of such dimensions that very slight depression of the top B of the container will result in fracture, and that the material of which the vessel is made should be of such character that complete fracture occurs—that is to say, sufficient to allow the whole of the contained chemical to escape.

The relative proportions of the chemicals are such that the required heat is obtained and maintained for a sufficient length of time to effect its purpose, and also effect complete re-action so that after the re-action has ceased, there is produced a neutral residual substance.

I claim:

1. A vulcanizing unit for a patch repair outfit of the type referred to, comprising a closed hollow metal container of deformable construction, a repair patch secured to one exterior face of said container, within said container a sealed glass vessel containing a liquid acid and which is fractured to release said acid by sufficient deformation of said container, and a quantity of a chemical substance packed adjacent said vessel in said container, said chemical substance co-operating with the released acid to generate heat by chemical reaction to effect vulcanization of the patch.

2. A vulcanizing unit for a patch repair outfit of the type referred to, comprising a closed hollow metallic container with a deformable upper face, a patch secured to the exterior surface of the lower face of said container, within said container a sealed glass vessel containing liquid acid and which is fractured to release the acid by deformation of the said upper face of the container, a quantity of a chemical substance packed about said glass vessel, said chemical substance co-operating with the released acid to generate vulcanizing heat, and packing about said glass vessel to prevent movement of it in the container.

3. A vulcanizing patch repair outfit including a vulcanizing unit comprising a closed hollow container of deformable metal, a patch secured to an exterior face of said container, within said container a glass vessel containing liquid acid and which is fractured upon deformation of the container, a quantity of a chemical substance packed adjacent said glass vessel and which co-operates with said acid to generate vulcanizing heat for the said patch upon deformation of the metallic container, and a clamp fitted with an adjustable operative head formed to hold the vulcanizing unit on the work and to deform the metallic container sufficiently to fracture the glass vessel.

GEORGE SAMUEL DAWE.